United States Patent Office 3,078,297
Patented Feb. 19, 1963

3,078,297
PROCESS FOR PREPARING PROPIONIC NITRILE
Karl Smeykal, Leuna, and Heinrich Pallutz, Bad Durrenberg, Germany, assignors to VEB Leuna-Werke "Walter Ulbricht," Leuna, Kreis Merseburg, Germany
No Drawing. Filed June 18, 1959, Ser. No. 821,119
Claims priority, application Austria Jan. 14, 1959
4 Claims. (Cl. 260—465.1)

The invention relates to a proces for perparing propionic nitrile by catalytic hydrogenation of acrylic nitrile.

Processes are already known for the catalytic hydrogenation of acrylic nitrile at ordinary or increased pressure, in liquid or gaseous reaction medium, which result in the formation of propionic nitrile. The known processes use as a catalyst metallic copper or Raney-Nickel.

While it is possible to obtain propionic nitrile with the aid of the above-mentioned catalysts, it was found that in continuous operation, more particularly in gaseous media, a rapid decrease of the catalytic activity of copper or nickel catalysts known from the literature occurs. This fact is of great disadvantage in carrying out hydrogenation reactions for industrial purposes, because a frequent cumbersome and expensive recharge of the apparatus with catalyst materials becomes necessary; at the same time, work has to be interrupted so that loss of time and labor is incurred.

It is an object of the present invention to overcome the above-mentioned drawbacks of the known processes for the preparation of propionic nitrile from acrylic nitrile.

It is another object of the invention to provide a process for the preparation of propionic nitrile by catalytic hydrogenation of acrylic nitrile which can be carried out for long periods without the catalytic mass losing any of its catalytic activity.

Other objects and advantages of the present invention will become apparent from the following description:

It has been found that a very effective hydrogenation of acrylic nitrile can be carried out when the catalysts contain as active ingredients sulfides of metals of the 6th and 8th groups of the periodic table of elements.

The sulfides to be used as catalysts may either be simple sulfides, such as $WS_2$ or $MoS_2$, or they may be a combination of sulfides such as $2NiS.WS_2$, $NiS.MoS_2$, $CoS.MoS_2$, and similar compound sulfides.

The process is preferably carried out continuously, with hydrogen and acrylic nitrile being passed through a reactor at increased pressures, ranging from 50 atmospheres excess pressure to 200 atmospheres, and to as much as 500 atmospheres at temperatures from about 130°–200° C. Preferably, the hydrogen is present in large excess quantities; the preferred temperature range is 150°–160° C.

The catalysts can be either used as such, for instance in grains or pellets of the sulfides used in a particular case, or they may be adsorbed on a carrier substance. As carriers we may mention, for instance: Alumina, silica gel, kaolin; furthermore, natural or synthetic silicates, e.g., aluminum silicate, bleaching earth, and similar materials.

When as catalysts compound sulfides are to be used, these can easily be prepared by passing hydrogen sulfide over a salt formed of the components to be made into sulfides, e.g., nickel tungstanate, cobalt molydate and the like. Since in this preparation, $H_2S$ is adsorbed in excess, it is desirable to subject the catalysts, before using them, to a treatment in a current of hydrogen at ordinary or increased pressure, and at temperatures between 400° and 500° C., until the escaping hydrogen does no longer contain any noticeable quantity of hydrogen sulfide.

The acrylic nitrile, which is used as starting material, is liable to undergo polymerization which causes obstruction to occur in the apparatus, frequently already in the preheating zone; it is, therefore, advantageous to add a small amount of a stabilizer, for instance hydroquinone, to the acrylic nitrile. It is, moreover, advisable to work in the presence of diluting agents which are not changed under the reaction conditions; such agents are for instance saturated aliphatic or cyclo-aliphatic hydrocarbons or alcohols, such as n-butanol, isobutanol, isopropanol, and the like. Operating in the presence of such compounds facilitates dissipation of the considerable reaction heat, and will contribute to stabilize the acrylic nitrile i.e. it will counter-act polymerization.

In this manner, it is possible to produce propionic nitrile by hydrogenation of acrylic nitrile under the conditions given above and with the use of the mentioned catalysts for a very long period of continuous operation without any decrease of catalyst activity. While formation of amines is sometimes observed initially, when metallic catalysts are used, caused by further hydrogenation of the nitrile group, no such amine formation will be noticeable with the use of sulfidic catalysts.

It is not absolutely necessary to use a specially purified hydrogen in the hydrogenation reaction, but technical hydrogen may very well be used, which contains apart from inert gases small amounts of so-called contact poisons, e.g., CO or $H_2S$.

The acrylic nitrile to be used can be either the one prepared from eethylene cyanohydring by dehydration, or the one made from acetylene by addition of hydrocyanic acid. Although the latter frequently contains small amounts of divinyl acetylene, this does not impair the hydrogenation of acrylic nitrile to propionic nitrile.

The separation of propionic nitrile from the hydrogenation products, is preferably done by rectifying distillation, particularly in cases where a diluting agent, such as n-butanol, is used. The so prepared propionic nitrile can be used in the production of herbicides, pharmaceutical products, and the like.

In the following, the invention will be more fully described in a number of examples, but it should be understood that these are given by way of illustration and not of limitation. Many changes in the details can be made without departing from the spirit of the invention.

All parts are by volume.

*Example 1*

A vertical high pressure tube of chromium steel is filled with pieces of a catalyst composed of $2NiS.WS_2$. Over the catalyst, hydrogen is passed at a temperature of 450° C. and an excess pressure of 200 atmospheres, until no noticeable traces of hydrogen sulfide can be found in the gas escaping from the tube. After the temperature in the catalyst chamber has been allowed to drop to 150° C., 0.44 part of a mixtture containing 55% n-butanol and 45% acrylic nitrile, with addition of 0.2% of hydroquinone as stabilizer, per 1 part of catalyst are injected hourly into the apparatus at an excess pressure of 200 atmospheres. Simultaneously, per 1 part of catalyst, 3,750 parts of hydrogen (measured without pressure) are introduced so that during the reaction all components are in gas form. The reaction gases are cooled down to 20° C., whereby the propionic nitrile formed separates together with n-butanol in liquid form. After pressure is released from the liquid products to atmospheric, the propionic nitrile, B.P. 97° C., can be easily separated from the n-butanol, B.P. 117° C., by fractional distillation. The yield in propionic nitrile is practically quantitative.

The n-butanol can be used again as solvent for acrylic nitrile. Excess hydrogen is re-circulated into the process by a pump. After a period of 160 days of operation, no decrease in catalyst activity can be observed.

Example 2

The reaction conditions are the same as described in Example 1, with the difference that a mixture of 65% acrylic nitrile and 35% n-butanol (with 0.2% hydroquinone as stabilizer) are subjected to continuous hydrogenation. The yield in the propionic nitrile is likewise practically quantitative. After 120 days of operation, no decrease in catalyst activity can be observed.

Example 3

Undiluted acrylic nitrile, stabilized with 0.2% hydroquinone is subjected to continuous hydrogenation in the high pressure apparatus and under the conditions of temperature and pressure given in Examples 1 and 2; per one part of catalyst, 0.37 part acrylic nitrile (liquid) and 3,750 parts hydrogen (measured without pressure) are passed hourly through the reaction chamber. Propionic nitrile is obtained in a yield of 90% of the theoretical. After 50 days of operation, no decrease in catalyst activity is noted.

Example 4

A vertical high pressure tube of chromium steel provided with means for external heating, was filled with catalyst pellets consisting of $2NiS.WS_2$. Through the catalyst zone hydrogen was passed at a temperature of 440° C. and at atmospheric pressure, until no substantial quantities of hydrogen sulfide were contained in the gas escaping from the tube. The temperature in the catalyst zone is then allowed to drop to 160° C. and the hydrogen pressure is raised to 240 atmospheres excess pressure. Under these conditions, 0.53 part of a mixture containing 55% isoamyl alcohol and 45% acrylonitrile, with addition of 0.2% hydroquinone as stabilizer, per one part of catalyst are injected hourly into the high pressure apparatus. Simultaneously, per one part catalyst 8,000 parts of hydrogen (measured without pressure) are introduced. The excess hydrogen leaving the reaction zone is returned by a pump into the process. The reaction gases are cooled down to 20° C. yielding a mixture of propionic nitrile and isoamyl alcohol. The liquid products are brought down to atmospheric pressure and subjected to rectifying distillation. At 97° C. pure propionic nitrile distills off in a yield corresponding to 98% of the theoretical and at 132° C. isoamyl alcohol is distilling which may be re-used as solvent for acrylic nitrile. After a period of 150 days of operation, there was no noticeable decrease in catalyst activity.

Example 5

The operation was carried out as described in Example 4, with the difference that instead of the catalyst there mentioned $CoS.MoS_2$ was used. The yield in propionic nitrile was 95%. The catalyst was still active after 50 days.

Example 6

The operation was carried out as described in Example 1, but instead of the catalyst there mentioned, $WS_2$ was used which was pressed into pill form. The yield in propionic nitrile was 92%. After 40 days of operation, no decrease in catalyst activity can be observed.

Example 7

If instead of the catalyst mentioned in Example 1, a catalyst consisting of 65% $2NiS.WS_2$ plus 35% of active alumina is used and pressure is maintained at 130 atmospheres instead of 200, the other conditions being equal to Example 1, propionic nitrile will be obtained in a yield of 94.5%. After a period of 42 days of operation, no decrease in catalyst activity is noted.

As may be seen from the examples, the catalyst can be used in the form of grains or individual pieces, or in compressed form, e.g., in pill or pellet form. The sizes of the grains and pills, respectively, may vary over a wide range and will depend on the size of the reactor.

The amount of acrylic nitrile which is passed hourly through the catalytic zone is generally below one part by volume for one volume of catalyst. When the acrylic nitrile is used undiluted, the amount is about ⅓ of 1 part by volume hourly for one part of catalyst. When the acrylic nitrile is used in mixture with a diluent, about 0.5 part by volume of the mixture are passed through hourly for one part of the catalyst.

The hourly throughput of acrylic nitrile solution can be decreased, without impairing the course of the reaction, e.g., down to about 0.2 part by volume of the solution for one part of catalyst. As to an increase of the ratio, not considerably more than 1.5 parts by volume of the solution for 1 part of catalyst should be used.

It should be understood that the foregoing disclosure only relates to preferred embodiments of the invention and that it is intended to cover all modifications of the examples herein which do not constitute departures from the spirit and scope of the invention as set forth in the appended claims.

What is claimed is:

1. A process for preparing propionic nitrile by catalytic hydrogenation of acrylic nitrile, which comprises subjecting acrylic nitrile at increased pressure ranging from 50 to 500 atmospheres, and elevated temperature ranging from 130° C. to 200° C. to the action of a large excess amount of hydrogen in the presence of a substance stabilizing said nitrile against polymerization and in the presence of a metal sulfide as catalyst, said catalyst being selected from the group consisting of $WS_2$, $MoS_2$, $2NiS.WS_2$, $NiS.MoS_2$, $CoS.MoS_2$.

2. The process as claimed in claim 1, wherein said catalyst is adsorbed on an inert carrier substance.

3. A process for preparing propionic nitrile by catalytic hydrogenation of acrylic nitrile which comprises reacting acrylic nitrile in continuous operation wtih large excess quantities of hydrogen at increased pressures ranging from 130 to 240 atmospheres and at elevated temperatures ranging from 150° to 160° C. in the presence of a substance stabilizing said nitrile against polymerization and in the presence of a metal sulfide as a catalyst, said catalyst being selected from the group consisting of $WS_2$, $MoS_2$, $2NiS.WS_2$, $NiS.MoS_2$, and $CoS.MoS_2$, the amount of acrylic nitrile being passed hourly through said catalyst being below one part by volume per one part by volume of catalyst.

4. A process for preparing propionic nitrile by catalytic hydrogenation of acrylic nitrile which comprises reacting acrylic nitrile in continuous operation with large excess quantities of hydrogen at increased pressures ranging from 130 to 240 atmospheres and at elevated temperatures ranging from 150° to 160° C. in the presence of a substance stabilizing said nitrile against polymerization and in the presence of a metal sulfide as a catalyst, said catalyst being selected from the group consisting of $WS_2$, $MoS_2$, $2NiS.WS_2$, $NiS.MoS_2$ and $CoS.MoS_2$, said acrylic nitrile being used in mixture with an organic diluent in the approximate volumetric ratio 1 to 2 parts nitrile: 1 part diluent.

References Cited in the file of this patent

UNITED STATES PATENTS

| | | |
|---|---|---|
| 2,334,140 | Winans | Nov. 9, 1943 |
| 2,644,834 | Max | July 7, 1953 |

OTHER REFERENCES

Berkman et al.: "Catalysis," 1940, pp. 279, 821, 833 and 861. (Copy in Library.)